US012694614B2

(12) United States Patent
Ino et al.

(10) Patent No.: US 12,694,614 B2
(45) Date of Patent: Jul. 28, 2026

(54) IMAGING DEVICE, AND CONTROL METHOD OF IMAGING DEVICE

(71) Applicant: CANON KABUSHIKI KAISHA, Tokyo (JP)

(72) Inventors: Kazuya Ino, Kanagawa (JP); Masato Uchihara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 18/739,725

(22) Filed: Jun. 11, 2024

(65) Prior Publication Data
US 2024/0428513 A1 Dec. 26, 2024

(30) Foreign Application Priority Data
Jun. 20, 2023 (JP) ................................. 2023-100922

(51) Int. Cl.
G06T 15/00 (2011.01)
G06T 7/70 (2017.01)
(Continued)

(52) U.S. Cl.
CPC ................ G06T 17/00 (2013.01); G06T 7/70 (2017.01); H04N 13/282 (2018.05); H04N 13/383 (2018.05)

(58) Field of Classification Search
CPC ....... G06T 19/00; G06T 15/005; G06T 17/20; G06T 17/00; G06T 15/10; G06T 15/00; G06T 13/40; G06T 15/06; G06T 15/08; G06T 15/20; G06T 15/04; G06T 2210/41; G06T 1/20; G06T 19/006; G06T 7/337; G06T 7/50; G06T 7/74; G06T 19/20;

G06T 2200/04; G06T 2207/10016; G06T 2207/30244; G06T 2219/024; G06T 2219/2016; G06T 2210/12; G06T 2210/21; G06T 7/70; G06T 2207/20084; G06T 1/60; G06T 13/20; G06T 7/20; H04N 23/57; H04N 23/90; H04N 23/64; H04N 23/611; H04N 23/635; H04N 7/147; H04N 7/157; G06F 16/51; G06F 21/602; G06F 3/013;
(Continued)

(56) References Cited

U.S. PATENT DOCUMENTS 6,177,952 B1 * 1/2001 Tabata ................. H04N 13/239
348/E13.059
11,968,350 B2 4/2024 Uehara
(Continued)

FOREIGN PATENT DOCUMENTS

| JP | H10-040423 A | 2/1998 |
|----|--------------|--------|
| JP | H10-048569 A | 2/1998 |
| JP | 2020-154008 A | 9/2020 |

*Primary Examiner* — Gordon G Liu
(74) *Attorney, Agent, or Firm* — Venable LLP

(57) ABSTRACT

An imaging device configured to capture, in a real space, a stereo image of an object that is to be placed in a virtual space, using a first optical system and a second optical system, the imaging device including a processor, and a memory storing a program which, when executed by the processor, causes the imaging device to perform obtaining processing to obtain information relating to a vergence angle of a person relative to the object in the virtual space, and to perform control processing to control spacing between the first optical system and the second optical system based on the information.

15 Claims, 7 Drawing Sheets

(51) Int. Cl.
 *G06T 17/00*  (2006.01)
 *H04N 13/282* (2018.01)
 *H04N 13/383* (2018.01)

(58) Field of Classification Search
 CPC .......... G06F 3/012; G06F 3/011; G06F 3/017;
     G06F 3/167; G06V 20/20; G06V 10/25;
      G06V 2201/07; B33Y 50/00
 USPC ......................................................... 345/419
 See application file for complete search history.

(56)      References Cited

U.S. PATENT DOCUMENTS

2020/0183174 A1\*  6/2020  Noui ........................ G06F 3/013
2022/0003989 A1\*  1/2022  Nakamura ......... G02B 27/0075
2022/0007002 A1   1/2022  Uehara
2025/0350710 A1\*  11/2025  Routhier .............. H04N 13/344

\* cited by examiner

*FIG. 7A*
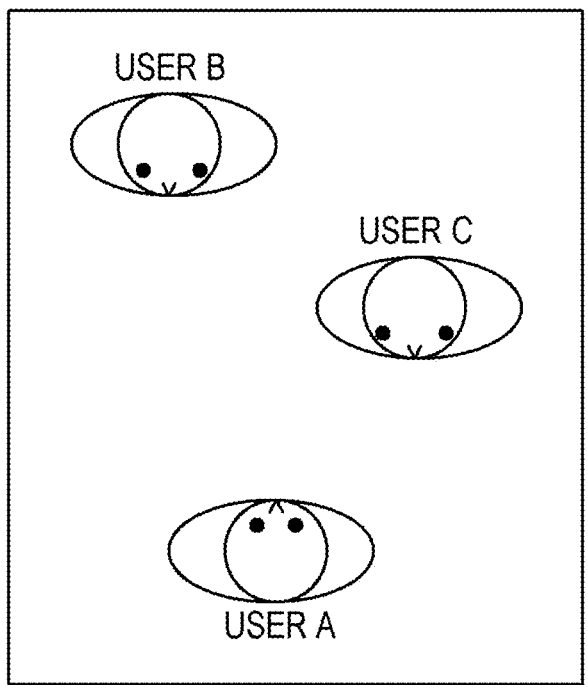
*FIG. 7B*
*FIG. 7C*
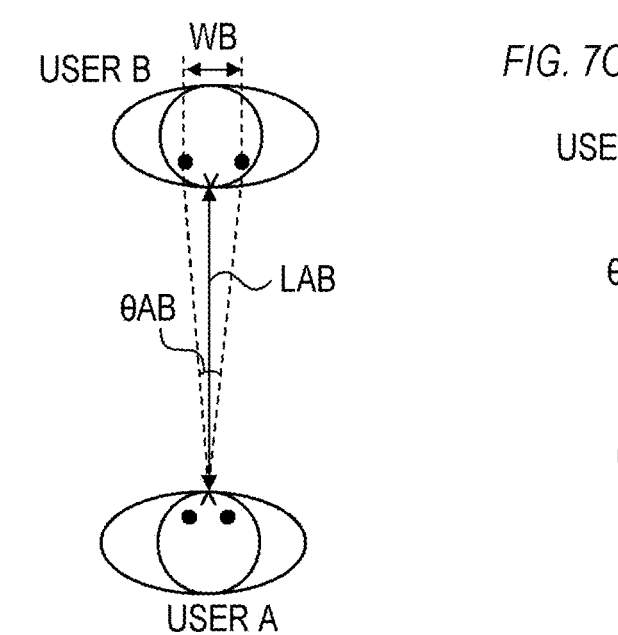

CAB 104a                    104b

M

θAB

USER A

CAC 104a                    104b

M

θAC

USER A

IMAGING DEVICE, AND CONTROL METHOD OF IMAGING DEVICE

BACKGROUND OF THE INVENTION

Field of the Invention

The present invention relates to an imaging device, and a control method of the imaging device.

Description of the Related Art

Techniques that allow the right eye and the left eye to see two images (right image and left image) taken from two positions (viewpoints) (the right eye to see the right image, and the left eye to see the left image) have been proposed. Humans perceive three-dimensionality by the working of the brain when they see two images with different viewpoints with left and right eyes. Thus stereopsis is achieved by letting the left and right eyes see two images with different viewpoints. The sense of three-dimensionality is enhanced by an increase in vergence angle, which is the angle between the line from one viewpoint to an object and the line from the other viewpoint to the object. Hereinafter, videos (images) viewed in three dimensions will be referred to as stereoscopic videos (stereoscopic images).

Techniques proposed so far include allowing people in remote sites to communicate with each other in real time with the use of video and audio, such as online meetings or medical consultations, and using stereoscopic videos in such communications. Also proposed are techniques for synthesizing (displaying) a stereoscopic image of an object (e.g., person) in a virtual space configured with CG images or real images, such as Metaverse, thereby to provide users the sensation as if the object actually exists there.

Japanese Patent Application Publication No. 2020-154008 discloses an imaging device that can change the spacing between two lenses for obtaining stereo images (right image and left image). Altering the spacing between the two lenses changes the vergence angle relative to the object, which in turn changes the three-dimensional sense of the object when the viewer sees the stereo image. Japanese Patent Application Publication No. H10-40423 discloses a technique that changes the video quality (roughness) of a person depending on the distance from the user to the person in a virtual space. Japanese Patent Application Publication No. H10-48569 discloses a technique that seemingly adjusts the three-dimensional sense by changing the angle (orientation) of left and right display surfaces depending on the distance from the user to an object in a virtual space.

However, conventional techniques sometimes fail to provide a favorable (natural) sense of three-dimensionality to an object in a virtual space. For example, images taken using the technique disclosed in Japanese Patent Application Publication No. 2020-154008 with a preset spacing (distance between the two lenses) that is designed to give a particular three-dimensional sense may not always produce a favorable three-dimensional sense, because the vergence angle of the user relative to an object varies depending on the distance from the user to the object in a virtual space. The technique disclosed in Japanese Patent Application Publication No. H10-40423 does not allow any change to be made in the three-dimensional sense. The technique disclosed in Japanese Patent Application Publication No. H10-48569 only seemingly adjusts the three-dimensional sense by changing the angle (orientation) of the display surfaces. Since the displayed image is unchanged, this technique is not sufficient to provide a favorable three-dimensional sense.

SUMMARY OF THE INVENTION

The present invention provides a technique that enables creation of a favorable (natural) three-dimensional sense of an object in a virtual space.

The present invention in its first aspect provides an imaging device configured to capture, in a real space, a stereo image of an object that is to be placed in a virtual space, using a first optical system and a second optical system, the imaging device including a processor, and a memory storing a program which, when executed by the processor, causes the imaging device to perform obtaining processing to obtain information relating to a vergence angle of a person relative to the object in the virtual space, and perform control processing to control spacing between the first optical system and the second optical system based on the information.

The present invention in its second aspect provides an imaging device configured to capture, in a real space, a stereo image of an object that is to be placed in a virtual space, using a first optical system and a second optical system, the imaging device including a controller configured to control spacing between the first optical system and the second optical system, wherein the spacing between the first optical system and the second optical system is different between a case where a distance from the object to a person in the virtual space is a first distance and a case where the distance is a second distance that is different from the first distance.

The present invention in its third aspect provides an imaging device configured to capture, in a real space, a stereo image of an object that is to be placed in a virtual space, using a first optical system and a second optical system, the imaging device including a controller configured to control spacing between the first optical system and the second optical system, wherein the spacing between the first optical system and the second optical system is different between a case where a person looking at the object in the virtual space is a person of which an eye spacing is a first spacing and a case where the person looking at the object in the virtual space is a person of which an eye spacing is a second spacing that is different from the first spacing.

The present invention in its fourth aspect provides a control method of an imaging device configured to capture, in a real space, a stereo image of an object that is to be placed in a virtual space, using a first optical system and a second optical system, the control method including obtaining information relating to a vergence angle of a person relative to the object in the virtual space, and controlling spacing between the first optical system and the second optical system based on the information.

The present invention in its fifth aspect provides a non-transitory computer readable medium that stores a program, wherein the program causes a computer to execute a control method of an imaging device configured to capture, in a real space, a stereo image of an object that is to be placed in a virtual space, using a first optical system and a second optical system, the control method comprising obtaining information relating to a vergence angle of a person relative to the object in the virtual space, and controlling spacing between the first optical system and the second optical system based on the information.

Further features of the present invention will become apparent from the following description of exemplary embodiments with reference to the attached drawings.

BRIEF DESCRIPTION OF THE DRAWINGS

FIGS. 7A to 7C are illustrative diagrams for explaining a method of calculating a vergence angle according to Embodiment 2; and FIGS. 8A and 8B are illustrative diagrams for explaining a method of calculating an imaging baseline length according to Embodiment 2.

DESCRIPTION OF THE EMBODIMENTS

Embodiment 1

Figure 1:
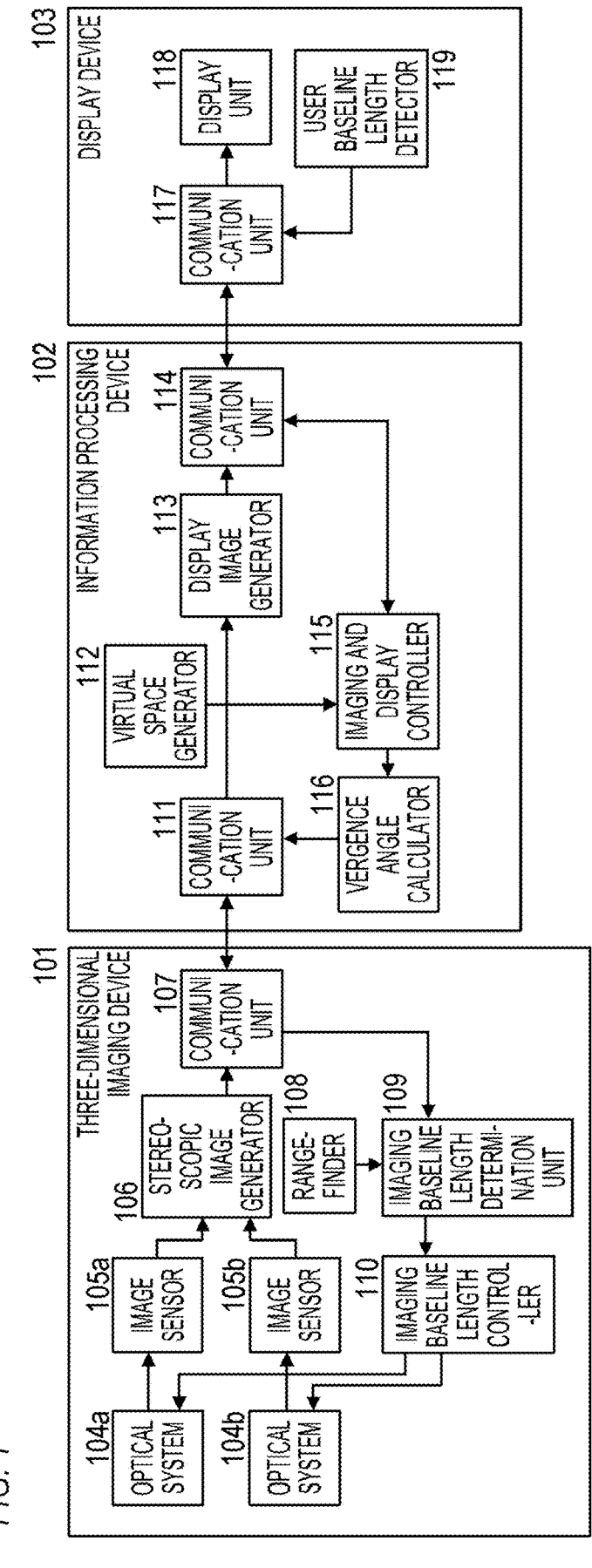
FIG. 1 is a configuration diagram of a system according to Embodiment 1.

Embodiment 1 of the present invention will be hereinafter described. FIG. 1 is a configuration diagram of a system according to Embodiment 1. In FIG. 1, a three-dimensional imaging device 101 captures a stereo image (stereoscopic image) of an object in a real space, using left and right lenses (optical systems). An information processing device 102 generates and manages a virtual space; it combines stereoscopic images captured by the three-dimensional imaging device 101 with images in a virtual space, to generate a display image (image in which the object of the three-dimensional imaging device 101 is placed in the virtual space) for a display device 103. The display device 103 displays images generated by the information processing device 102.

In Embodiment 1, for example, the three-dimensional imaging device 101 captures images of User A (a person), while the information processing device 102 generates a display image A', in which User A is placed in a virtual space. User B (another person), using the display device 103, sees the display image A' (User A in the virtual space). A three-dimensional imaging device similar to the three-dimensional imaging device 101 captures images of User B, and the information processing device 102 (or an information processing device similar to the information processing device 102) generates a display image B', in which User B is placed in a virtual space. User A, using a display device similar to the display device 103, sees the display image B' (User B in the virtual space). Thus User A and User B can communicate with each other in virtual spaces.

The three-dimensional imaging device 101 is a two-lens camera, for example. The information processing device 102 is a server connected to the three-dimensional imaging device 101 and display device 103 via the Internet, for example, or a personal computer connected to the display device 103. The display device 103 is a head-wearable display device (head-mounted display), for example. The three-dimensional imaging device 101, information processing device 102, and display device 103 are not limited to these.

The three-dimensional imaging device 101 will be described. Reference numerals 104a and 104b denote a pair of left and right optical systems. The optical system 104a and optical system 104b each include a lens and a diaphragm, and are configured to be able to adjust focus and exposure. Reference numerals 105a and 105b denote a pair of left and right image sensors. The image sensor 105a and image sensor 105b are each a CMOS sensor, for example, and capture an image by converting an optical image into an electrical signal (analog image signal). The image sensor 105a and image sensor 105b each include an A/D conversion circuit, for converting the obtained analog image signals into digital image data, and output the digital image data. While two images are captured by two image sensors 105a and 105b in this example, a single image sensor may capture two images.

A stereoscopic image generator 106 uses the two images (digital image data) output from the two image sensors 105a and 105b to generate a stereoscopic image (stereo image) in which the two images are arranged as a pair of left and right images. A communication unit 107 performs communications with the information processing device 102. For example, the communication unit 107 transmits a stereoscopic image to the information processing device 102, or receives vergence angle information from the information processing device 102. Vergence angle information is information relating to angles of vergence, e.g., information indicative of a vergence angle.

A rangefinder 108 measures the distance from the three-dimensional imaging device 101 to the object (User A) in the real space to acquire object distance information. Object distance information is information relating to distances from the three-dimensional imaging device 101 to User A, e.g., information indicative of a distance. An imaging baseline length determination unit 109 determines the imaging baseline length (spacing between the optical system 104a and the optical system 104b) based on the vergence angle information obtained by the communication unit 107 and the object distance information obtained by the rangefinder 108. When the distance from the three-dimensional imaging device 101 to User A is predetermined, the imaging baseline length may be determined only on the basis of the vergence angle information. An imaging baseline length controller 110 drives the optical systems 104a and 104b to control (change) the imaging baseline length of the three-dimensional imaging device 101 to the one determined by the imaging baseline length determination unit 109.

The information processing device 102 will be described. A communication unit 111 performs communications with the three-dimensional imaging device 101 (communication unit 107). For example, the communication unit 111 transmits vergence angle information to the three-dimensional imaging device 101, and receives a stereoscopic image from the three-dimensional imaging device 101. A virtual space generator 112 generates and manages virtual space data. The virtual space generator 112 also manages distances between virtual objects in the virtual space, and the information on users (Users A and B) who are using the virtual space. A display image generator 113 combines stereoscopic images obtained by the communication unit 111 with the virtual space generated by the virtual space generator 112, to generate a display image that represents a viewing field of User B (virtual object) in the virtual space. A communication unit 114 performs communications with the display device 103. For example, the communication unit 114 transmits a display image to the display device 103, and receives user baseline length information of User B from the display device 103. User baseline length information of User B is information relating to user baseline lengths of User B (spacing between the eyes of User B), e.g., information indicative of a user baseline length.

An imaging and display controller 115 controls the three-dimensional imaging device 101 and display device 103. For example, the imaging and display controller 115 obtains user distance information relating to the distance from User A (virtual object) to User B (virtual object) in a virtual space from the virtual space generator 112, and obtains user baseline length information of User B from the communication unit 114. User distance information indicates a distance from User A to User B in a virtual space, for example. A vergence angle calculator 116 calculates the vergence angle of User B relative to User A in a virtual space based on the user distance information and user baseline length information obtained by the imaging and display controller 115. Vergence angle information indicative of this vergence angle is transmitted to the three-dimensional imaging device 101. Since a difference in user baseline length results in a relatively small difference in the three-dimensional sense, a predetermined fixed value may be used as the user baseline length, i.e., the vergence angle may be calculated based only on the user distance information.

The information processing device 102 carries out processing similar to the above-described processing for the three-dimensional imaging device of User B and the display device of User A. Thus vergence angle information indicative of the vergence angle of User A relative to User B in a virtual space is transmitted to the three-dimensional imaging device of User B, and a display image representing the viewing field of User A in the virtual space is transmitted to the display device of User A.

The display device 103 will be described. A communication unit 117 performs communications with the information processing device 102 (communication unit 114). For example, the communication unit 117 transmits user baseline length information of User B to the information processing device 102, and receives a display image from the information processing device 102. A display unit 118 displays images received by the communication unit 117. A user baseline length detector 119 detects the user baseline length of User B in the display device 103.

Some of the processing in the information processing device 102 may be performed by the three-dimensional imaging device 101, or by the display device 103. For example, the user distance information (and user baseline length information) may be transmitted to the three-dimensional imaging device 101, and the vergence angle of User B relative to User A in the virtual space may be calculated by the three-dimensional imaging device 101. The system may not include the information processing device 102, and the processing may all be performed by the three-dimensional imaging device 101 and the display device 103.

Figure 2:
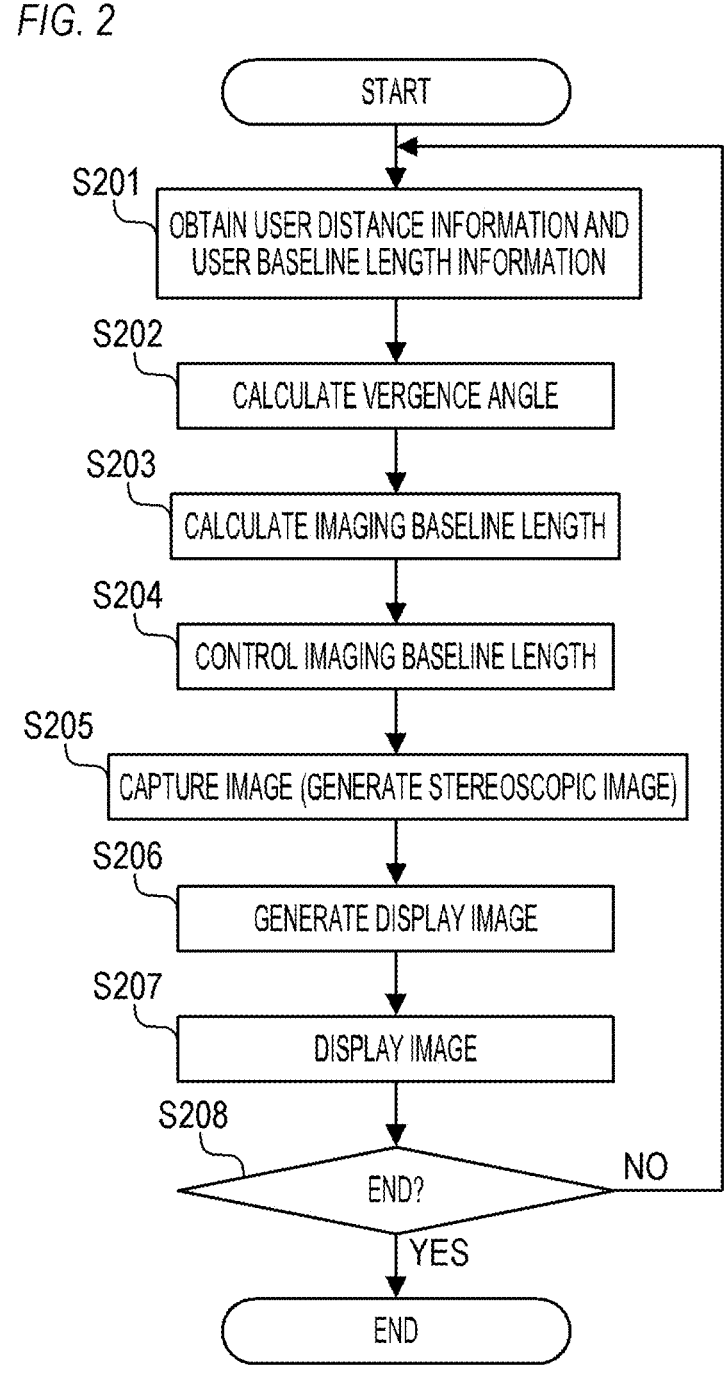
FIG. 2 is a flowchart showing the operation of the system according to Embodiment 1.
Figure 3:
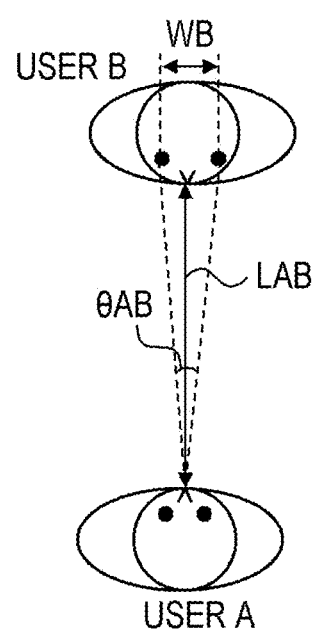
FIG. 3 is an illustrative diagram for explaining a method of calculating a vergence angle according to Embodiment 1.
Figure 4:
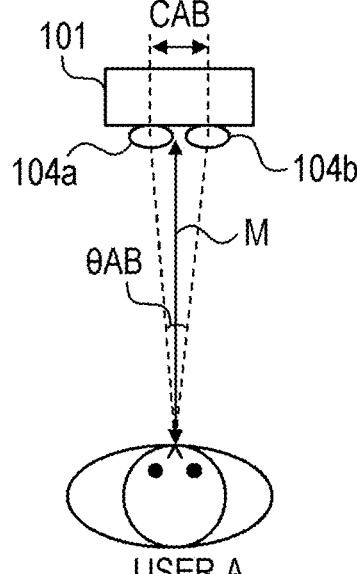
FIG. 4 is an illustrative diagram for explaining a method of calculating an imaging baseline length according to Embodiment 1.

The system operation according to Embodiment 1 will be described with reference to FIGS. 2 to 4. FIG. 2 is a flowchart showing the operation of the system according to Embodiment 1. The operation in FIG. 2 is implemented, for example, by respective devices executing programs that are stored in the devices in advance. FIG. 3 is an illustrative diagram for explaining a method of calculating a vergence angle of User B relative to User A in a virtual space. The drawing shows a positional relationship between User A and User B in the virtual space. FIG. 4 is an illustrative diagram for explaining a method of calculating an imaging baseline length. The drawing shows a positional relationship between a three-dimensional imaging device 101A and User A in a real space. The following describes the operation of presenting a display image on the display device 103 of User B. The operation of presenting a display image on the display device of User A is similar to the operation of presenting a display image on the display device 103 of User B, and therefore will not be described.

At S201, the imaging and display controller 115 obtains user distance information indicative of a distance from User A to User B in a virtual space (distance LAB in FIG. 3) from the virtual space generator 112. The imaging and display controller 115 also obtains user baseline length information indicative of a user baseline length of User B detected by the user baseline length detector 119 (user baseline length WB in FIG. 3) via the communication units 114 and 117.

At S202, the vergence angle calculator 116 calculates a vergence angle $\theta AB$ of User B relative to User A in the virtual space using the following Equation 1 based on the user distance LAB and user baseline length WB obtained at S201.

$$\theta AB = 2 \times \arctan\left(WB/(2 \times LAB)\right) \qquad \text{(Equation 1)}$$

At S203, the imaging baseline length determination unit 109 determines an imaging baseline length based on the vergence angle information obtained by the communication unit 107 and the object distance information obtained by the rangefinder 108. The imaging baseline length is determined, for example, such that the vergence angle of the three-dimensional imaging device 101 relative to User A in the real space substantially matches the vergence angle $\theta AB$ of User B relative to User A in the virtual space. The vergence angle information indicates the vergence angle $\theta AB$ calculated at S202, and the object distance information indicates the distance M in FIG. 4 (distance from the three-dimensional imaging device 101 to User A). The imaging baseline length determination unit 109 calculates the imaging baseline length CAB using the following Equation 2 from the vergence angle $\theta AB$ and distance M.

$$CAB = 2 \times M \times \tan(\theta AB/2) \qquad \text{(Equation 2)}$$

At S204, the imaging baseline length controller 110 drives the optical systems 104a and 104b to control (change) the imaging baseline length of the three-dimensional imaging device 101 to the imaging baseline length CAB calculated at S203. Thus a stereoscopic image, which can provide a three-dimensional sense felt by User B seeing User A at distance LAB, is taken.

At S205, the image sensors 105a and 105b capture an image of User A, the stereoscopic image generator 106 generates a stereoscopic image, and the communication unit 107 transmits the stereoscopic image to the information processing device 102.

At S206, the display image generator 113 combines the stereoscopic image obtained by the communication unit 111 (stereoscopic image obtained at S205) with the virtual space generated by the virtual space generator 112, to generate a display image that represents the viewing field of User B in the virtual space. The generated display image is transmitted to the display unit 118 via the communication units 114 and 117.

At S207, the display unit 118 displays the display image generated at S206.

At S208, the imaging and display controller 115 determines whether or not an ending condition is met. An ending condition may be an instruction given by User B to end the operation, or may be disconnection of the display device 103 from the information processing device 102. The steps S201 to S208 are repeated until an ending condition is met. When an ending condition is met, the operation in FIG. 2 ends.

The imaging baseline length of the three-dimensional imaging device 101 is controlled (changed) in accordance with a change in the distance LAB from User A to User B in the virtual space by repeating the steps S201 to S208. This enables constant capturing of stereoscopic images that provide a favorable (natural) three-dimensional sense. The user baseline length WB need only be obtained at the start, as it does not change, and need not be obtained repeatedly. The user baseline length WB may be registered in advance in the virtual space generator 112 as User B information. A pre-registered user baseline length WB may be used.

According to the operation of FIG. 2, the imaging baseline length of the three-dimensional imaging device 101 will be different when the distance LAB from User A to User B in the virtual space is a first distance and when the distance LAB is a second distance (that is not the first distance), even when the person (User B) stays at the same position. Even if the distance LAB stays the same, the imaging baseline length of the three-dimensional imaging device 101 will be different when User B is a person who has a first spacing between the eyes (user imaging baseline length) and when User B is a person who has a second spacing between the eyes (that is not the first spacing).

As described above, according to Embodiment 1, the three-dimensional imaging device 101 obtains information on the vergence angle of a person relative to an object in a virtual space, and controls the spacing between the optical system 104a and the optical system 104b based on this information. This enables creation of a favorable (natural) three-dimensional sense of the object in the virtual space.

Embodiment 2

Embodiment 2 of the present invention will be hereinafter described. In the following, the same features as Embodiment 1 (e.g., same configurations and processing as those of Embodiment 1) will be omitted as suited.

In the example described in Embodiment 1, two users communicate with each other in a virtual space. In the example in Embodiment 2, more than two users communicate with each other in a virtual space. The number of users is not particularly limited. In Embodiment 2, three users A to C communicate with each other. When plural users see the same virtual object, there may be a difference in users' vergence angle relative to the virtual object among the users. For example, the vergence angle of User B relative to User A in the virtual space may be different from the vergence angle of User C relative to User A. Therefore, even when the stereoscopic image of User A gives User B a favorable (natural) three-dimensional sense, this stereoscopic image is not necessarily going to give User C a favorable (natural) three-dimensional sense. Embodiment 2 is intended to give both User B and User C a favorable (natural) three-dimensional sense of the stereoscopic image of User A.

Figure 5:
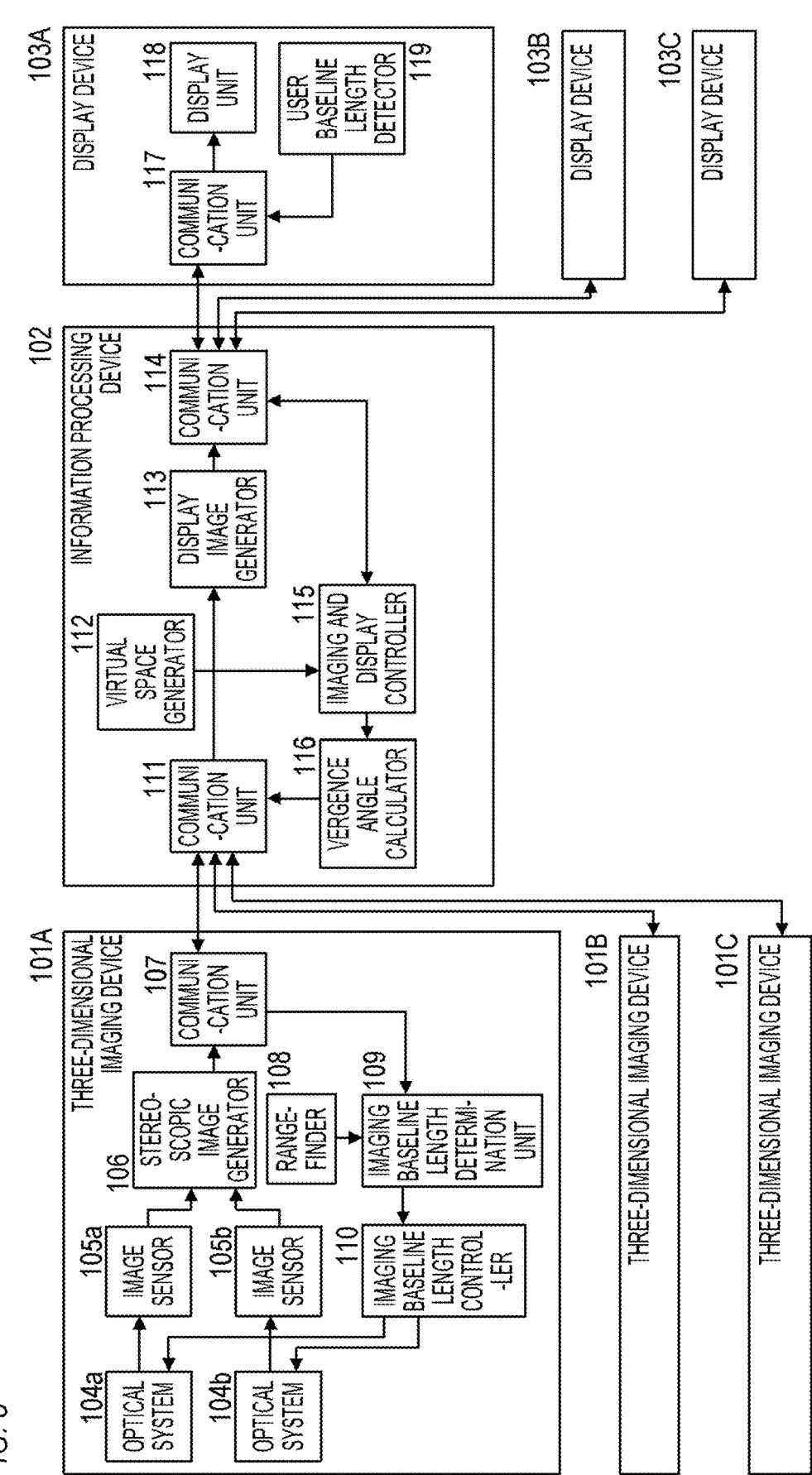
FIG. 5 is a configuration diagram of a system according to Embodiment 2.

FIG. 5 is a configuration diagram of a system according to Embodiment 2. The system according to Embodiment 2 includes three-dimensional imaging devices 101A to 101C, an information processing device 102, and display devices 103A to 103C. The three-dimensional imaging devices 101A, 101B, and 101C are the respective three-dimensional imaging devices of Users A, B, and C. The display devices 103A, 103B, and 103C are the respective display devices of Users A, B, and C. The three-dimensional imaging devices 101A to 101C each have the same configuration as that of the three-dimensional imaging device 101 in Embodiment 1 (FIG. 1). The information processing device 102 has the same configuration as that of the information processing device 102 in Embodiment 1 (FIG. 1). The display devices 103A to 103C each have the same configuration as that of the display device 103 in Embodiment 1 (FIG. 1).

Figure 6:
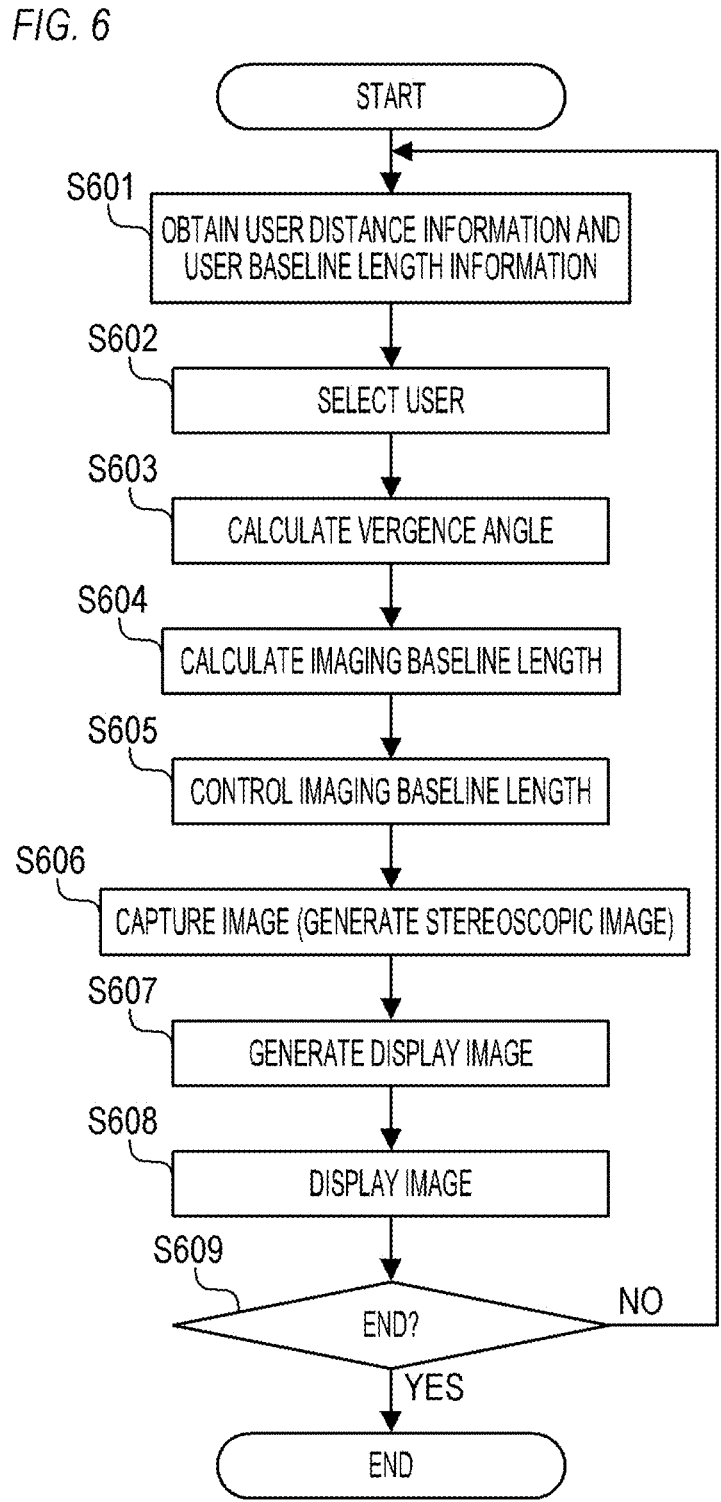
FIG. 6 is a flowchart showing the operation of the system according to Embodiment 2.
Figures 8A, 8B:
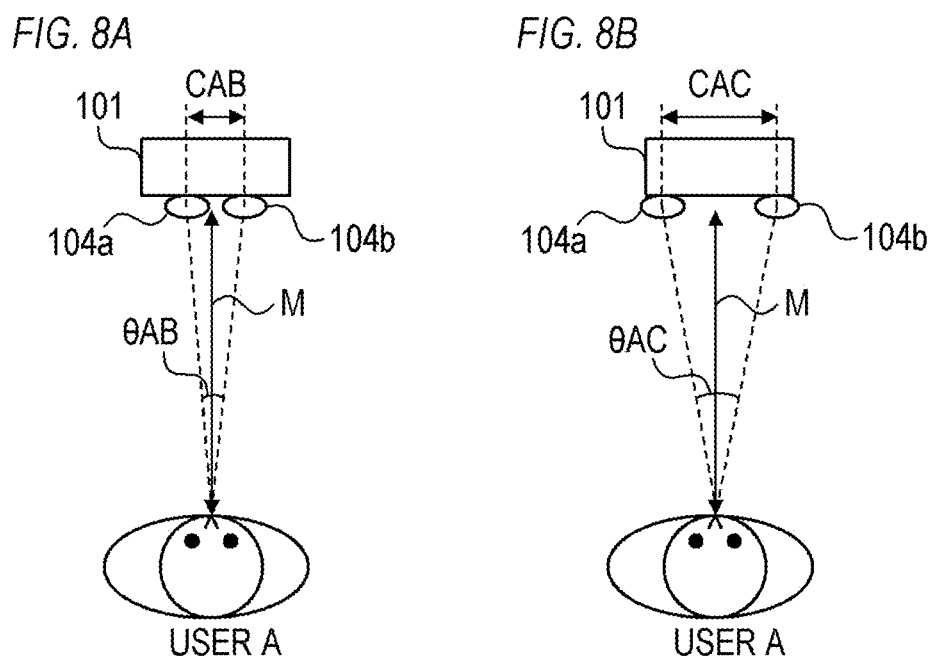

The system operation according to Embodiment 2 will be described with reference to FIG. 6, FIGS. 7A to 7C, and FIGS. 8A and 8B. FIG. 6 is a flowchart showing the operation of the system according to Embodiment 2. The operation in FIG. 6 is implemented, for example, by respective devices executing programs that are stored in the devices in advance. FIGS. 7A to 7C are illustrative diagrams for explaining a method of calculating vergence angles of Users B and C relative to User A in a virtual space. The drawing shows a positional relationship between Users A, B, and C in the virtual space. FIGS. 8A and 8B are illustrative diagrams for explaining a method of calculating an imaging baseline length. The drawing shows a positional relationship between a three-dimensional imaging device 101A and User A in a real space. The following describes the operation of displaying a stereoscopic image of User A on the display devices 103B and 103C of Users B and C. The operation of displaying a stereoscopic image of User B on the display devices 103A and 103C of Users A and C is similar to the operation of displaying a stereoscopic image of User A on the display devices 103B and 103C of Users B and C. The operation of displaying a stereoscopic image of User C on the display devices 103A and 103B of Users A and B is similar to the operation of displaying a stereoscopic image of User A on the display devices 103B and 103C of Users B and C.

At S601, the imaging and display controller 115 obtains user distance information indicative of the distance from User A to User B in the virtual space (distance LAB in FIG. 7B) from the virtual space generator 112. Similarly, the imaging and display controller 115 obtains user distance information indicative of the distance from User A to User C in the virtual space (distance LAC in FIG. 7C) from the virtual space generator 112. The imaging and display controller 115 also obtains user baseline length information indicative of the user baseline length of User B detected by the user baseline length detector 119 of the display device 103B (user baseline length WB in FIG. 7B) via the communication unit 114, and via the communication unit 117 of the display device 103B. Similarly, the imaging and display controller 115 obtains user baseline length information indicative of the user baseline length of User C detected by the user baseline length detector 119 of the display device 103C (user baseline length WC in FIG. 7C) via the communication unit 114, and via the communication unit 117 of the display device 103C.

At S602, the imaging and display controller 115 selects a user to whom the stereoscopic image of User A is to be presented (selects a display device on which the stereoscopic image of User A is to be displayed). The imaging and display controller 115 selects either User B or User C. As will be described in detail later, the steps S601 to S609 are repeated in the operation of FIG. 6. Here, let us assume that User B and User C are alternately selected by repeating S602.

Alternatively, S601 may be omitted, and the user distance information and user baseline length corresponding to the user selected at step S602 may be obtained after S602. For example, when User B is selected, user distance information indicative of the distance LAB and user baseline length information indicative of the user baseline length WB may be obtained. When User C is selected, user distance information indicative of the distance LAC and user baseline length information indicative of the user baseline length WC may be obtained.

Steps S603 to S609 are similar to S201 to S208 in Embodiment 1 (FIG. 2).

At S603, the vergence angle calculator 116 calculates a vergence angle. When User B is selected at S602, the vergence angle calculator calculates the vergence angle θAB of User B relative to User A in the virtual space using the following Equation 1-1 based on the User B's distance LAB and user baseline length WB. When User C is selected at S602, the vergence angle calculator calculates the vergence angle θAC of User C relative to User A in the virtual space using the following Equation 1-2 based on the User C's distance LAC and user baseline length WC.

$$\theta AB = 2 \times \arctan(WB/(2 \times LAB)) \qquad \text{(Equation 1-1)}$$

$$\theta AC = 2 \times \arctan(WC/(2 \times LAC)) \qquad \text{(Equation 1-2)}$$

As shown in FIGS. 7B and 7C, the User B's distance LAB and user baseline length WB are different from the User C's distance LAC and user baseline length WC. Therefore, the User B's vergence angle θAB differs from the vergence angle θAC of User C.

At S604, the imaging baseline length determination unit 109 of the three-dimensional imaging device 101A determines an imaging baseline length. When User B is selected at S602, the imaging baseline length CAB is calculated using the following Equation 2-1 from the vergence angle θAB and distance M. When User C is selected at S602, the imaging baseline length CAC is calculated using the following Equation 2-2 from the vergence angle θAC and distance M.

$$CAB = 2 \times M \times \tan(\theta AB/2) \qquad \text{(Equation 2-1)}$$

$$CAC = 2 \times M \times \tan(\theta AC/2) \qquad \text{(Equation 2-2)}$$

At S605, the imaging baseline length controller 110 of the three-dimensional imaging device 101A drives the optical systems 104a and 104b to control the imaging baseline length of the three-dimensional imaging device 101A. When User B is selected at S602, the imaging baseline length of the three-dimensional imaging device 101A is controlled (changed) to the imaging baseline length CAB. Thus a stereoscopic image, which can provide a three-dimensional sense felt by User B seeing User A at distance LAB, is taken. When User C is selected at S602, the imaging baseline length of the three-dimensional imaging device 101A is controlled (changed) to the imaging baseline length CAC. Thus a stereoscopic image, which can provide a three-dimensional sense felt by User C seeing User A at distance LAC, is taken.

At S606, the three-dimensional imaging device 101A (image sensors 105a and 105b, stereoscopic image generator 106, and communication unit 107) captures an image of User A, generates a stereoscopic image, and transmits the stereoscopic image to the information processing device 102.

At S607, the display image generator 113 combines the stereoscopic image obtained by the communication unit 111 (stereoscopic image obtained at S606) with the virtual space generated by the virtual space generator 112, to generate a display image. When User B is selected at S602, a display image representing the viewing field of User B in the virtual space is generated, and this display image is transmitted to the display device 103B via the communication unit 114. When User C is selected at S602, a display image representing the viewing field of User C in the virtual space is generated, and this display image is transmitted to the display device 103C via the communication unit 114.

At S608, the display image generated at S607 is displayed. When User B is selected at S602, the display unit 118 of the display device 103B displays the display image, and when User C is selected at S602, the display unit 118 of the display device 103C displays the display image.

At S609, the imaging and display controller 115 determines whether or not an ending condition is met. An ending condition may be an instruction given by User B or User C to end the operation, or may be disconnection of the display device 103B or 103C from the information processing device 102. The steps S601 to S609 are repeated until an ending condition is met. When an ending condition is met, the operation in FIG. 6 ends.

According to the operation in FIG. 6, the imaging baseline length of the three-dimensional imaging device 101A is alternately switched between the imaging baseline length corresponding to the vergence angle of User B, and the imaging baseline length corresponding to the vergence angle of User C. The stereoscopic image obtained with the imaging baseline length corresponding to the vergence angle of User B is displayed on the display device 103B, and the stereoscopic image obtained with the imaging baseline length corresponding to the vergence angle of User C is displayed on the display device 103C. This way, both User B and User C can have a favorable (natural) three-dimensional sense of the stereoscopic image of User A. The timing of switching of the imaging baseline lengths of the three-dimensional imaging device 101A is not particularly limited. The imaging baseline lengths of the three-dimensional imaging device 101A are switched at predetermined time intervals, for example.

The imaging baseline length of the three-dimensional imaging device 101A may be controlled on the basis of information on the vergence angle of a user looking at User A in the virtual space, without depending on information on the vergence angle of a user looking at User A in the virtual space. For example, the imaging baseline length of the three-dimensional imaging device 101A may not be changed to the imaging baseline length CAB when User B is not looking at User A, and may be changed to the imaging baseline length CAB only when User B is looking at User A. Similarly, the imaging baseline length of the three-dimensional imaging device 101A may not be changed to the imaging baseline length CAC when User C is not looking at User A, and may be changed to the imaging baseline length CAC only when User C is looking at User A.

The method of determining whether or not a user is looking at another user in the virtual space is not particularly limited. For example, the virtual space generator 112 may manage the positions and orientations of virtual objects. In this case, position and orientation information relating to the positions and orientations of users (virtual objects) in the virtual space may be obtained from the virtual space generator 112 with respect to each of Users A to C. The position and orientation information is information indicative of the position and orientation of a user (virtual object) in the virtual space, for example. The position and orientation information of Users A and B allows determination of whether or not User B is looking at User A. The position and orientation information of Users A and C allows determination of whether or not User C is looking at User A.

While the three-dimensional imaging device 101A switches the imaging baseline length among a plurality of imaging baseline lengths in the example described above, the imaging baseline length of the three-dimensional imaging device 101A may be controlled to an average of a plurality of imaging baseline lengths. This way, both User B and User C can have a generally favorable (natural) three-dimensional sense of the stereoscopic image of User A.

As described above, according to Embodiment 2, the three-dimensional imaging device obtains plural sets of information on the vergence angles, each set of information corresponding to each of plural people, and controls the spacing between the optical system 104a and the optical system 104b based on the plural sets of information. This way, each person can have a favorable (natural) three-dimensional sense of objects in the virtual space.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

The embodiment described above (including variation examples) is merely an example. Any configurations obtained by suitably modifying or changing some configurations of the embodiment within the scope of the subject matter of the present invention are also included in the present invention. The present invention also includes other configurations obtained by suitably combining various features of the embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-100922, filed on Jun. 20, 2023, which is hereby incorporated by reference herein in its entirety.

What is claimed is:

1. An imaging device configured to capture, in a real space, a stereo image of an object that is to be placed in a virtual space, using a first optical system and a second optical system, the imaging device comprising:
   a processor; and
   a memory storing a program which, when executed by the processor, causes the imaging device to
   (1) perform first obtaining processing to obtain first information relating to a vergence angle of a person relative to the object in the virtual space, and
   (2) perform control processing to control spacing between the first optical system and the second optical system based on the first information,
   wherein in the control processing, the spacing between the first optical system and the second optical system is controlled such that a vergence angle of the imaging device relative to the object in the real space substantially matches a vergence angle of the person relative to the object in the virtual space.

2. The imaging device according to claim 1, wherein the program, when executed by the processor, further causes the imaging device to perform a second obtaining processing to obtain second information relating to a distance from the imaging device to the object, and
   wherein in the control processing, the spacing between the first optical system and the second optical system is controlled on a basis of the first information and the second information.

3. The imaging device according to claim 1, wherein the first information indicates a distance from the object to the person in the virtual space, and
   wherein in the control processing, (1) a vergence angle of the person relative to the object in the virtual space is calculated on a basis of the first information, and (2) the spacing between the first optical system and the second optical system is controlled on a basis of the calculated vergence angle.

4. The imaging device according to claim 1, wherein in the first obtaining processing, a plurality of first information respectively corresponding to a plurality of people, are obtained, and wherein in the control processing, the spacing between the first optical system and the second optical system is controlled on a basis of the plurality of first information.

5. The imaging device according to claim 4, wherein in the control processing, the spacing between the first optical system and the second optical system is switched among a plurality of spacings respectively based on the plurality of first information.

6. The imaging device according to claim 5, wherein in the control processing, the spacing between the first optical system and the second optical system is switched at predetermined time intervals.

7. The imaging device according to claim 1, wherein, in the control processing, in a case where the person is looking at the object in the virtual space, the spacing between the first optical system and the second optical system is controlled on a basis of the first information.

8. The imaging device according to claim 7, wherein in the first obtaining processing, third information relating to a position and an orientation of the person in the virtual space is further obtained, and wherein in the control processing, whether or not the person is looking at the object in the virtual space is determined on a basis of the third information.

9. The imaging device according to claim 1, wherein the first information indicates a distance from the object to the person in the virtual space, wherein in the first obtaining processing, fourth information relating to an eye spacing of the person is further obtained, and wherein in the control processing, (1) a vergence angle of the person relative to the object in the virtual space is calculated on a basis of the first information and the fourth information, and (2) the spacing between the first optical system and the second optical system is controlled on a basis of the calculated vergence angle.

10. The imaging device according to claim 1, wherein in the control processing, the spacing between the first optical system and the second optical system is controlled such that a vergence angle of the imaging device relative to the object in the real space matches a vergence angle of the person relative to the object in the virtual space.

11. An imaging device configured to capture, in a real space, a stereo image of an object that is to be placed in a virtual space, using a first optical system and a second optical system, the imaging device comprising:

a controller configured to control spacing between the first optical system and the second optical system, wherein the spacing between the first optical system and the second optical system is different between (1) a case where a person looking at the object in the virtual space is a person of which an eye spacing is a first spacing and (2) a case where the person looking at the object in the virtual space is a person of which an eye spacing is a second spacing that is different from the first spacing.

12. A control method of an imaging device configured to capture, in a real space, a stereo image of an object that is to be placed in a virtual space, using a first optical system and a second optical system, the control method comprising:

obtaining information relating to a vergence angle of a person relative to the object in the virtual space; and controlling spacing between the first optical system and the second optical system based on the information, wherein the spacing between the first optical system and the second optical system is controlled such that a vergence angle of the imaging device relative to the object in the real space substantially matches a vergence angle of the person relative to the object in the virtual space.

13. The control method according to claim 12, wherein the spacing between the first optical system and the second optical system is controlled such that a vergence angle of the imaging device relative to the object in the real space matches a vergence angle of the person relative to the object in the virtual space.

14. A non-transitory computer-readable medium that stores a program, wherein the program causes a computer to execute a control method of an imaging device configured to capture, in a real space, a stereo image of an object that is to be placed in a virtual space, using a first optical system and a second optical system, the control method comprising:

obtaining information relating to a vergence angle of a person relative to the object in the virtual space; and controlling spacing between the first optical system and the second optical system based on the information, wherein the spacing between the first optical system and the second optical system is controlled such that a vergence angle of the imaging device relative to the object in the real space substantially matches a vergence angle of the person relative to the object in the virtual space.

15. The medium according to claim 14, wherein the spacing between the first optical system and the second optical system is controlled such that a vergence angle of the imaging device relative to the object in the real space matches a vergence angle of the person relative to the object in the virtual space.

* * * * *